United States Patent
Sekiguchi (10) Patent No.: US 6,823,261 B2
(45) Date of Patent: Nov. 23, 2004

(54) MONITOR SYSTEM OF VEHICLE OUTSIDE AND THE METHOD THEREOF

(75) Inventor: Hiroyuki Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/285,504

(22) Filed: Nov. 1, 2002

(65) Prior Publication Data

US 2003/0088361 A1 May 8, 2003

(30) Foreign Application Priority Data

Nov. 2, 2001 (JP) ........................................ 2001-338094

(51) Int. Cl.[7] .............................................. G06F 19/00
(52) U.S. Cl. ......................... 701/301; 701/96; 340/436; 340/903; 348/148
(58) Field of Search .................... 701/96, 301; 340/436, 340/903; 348/116, 118, 148

(56) References Cited

U.S. PATENT DOCUMENTS

| | | | | |
|---|---|---|---|---|
| 5,410,346 A | * | 4/1995 | Saneyoshi et al. .......... | 348/116 |
| 5,475,494 A | * | 12/1995 | Nishida et al. ............. | 356/4.01 |
| 5,633,705 A | | 5/1997 | Asayama | |
| 5,850,176 A | * | 12/1998 | Kinoshita et al. ........... | 340/435 |
| 6,114,951 A | * | 9/2000 | Kinoshita et al. ........... | 340/436 |
| 6,122,597 A | * | 9/2000 | Saneyoshi et al. .......... | 701/301 |
| 6,169,572 B1 | * | 1/2001 | Sogawa ....................... | 348/113 |
| 2003/0078730 A1 | * | 4/2003 | Sekiguchi ................... | 701/301 |
| 2003/0097237 A1 | * | 5/2003 | Sekiguchi ................... | 702/158 |

* cited by examiner

*Primary Examiner*—Gary Chin
(74) *Attorney, Agent, or Firm*—McGinn & Gibb, PLLC (57) ABSTRACT

A monitor system of a vehicle includes an image-measured distance detector for detecting a distance data between a vehicle and a three-dimensional object based on information of an image in front of the vehicle, a laser-measured distance detector for detecting the distance data between the vehicle and the object by projecting a laser beam from the vehicle, and a three-dimensional object recognition device for recognizing the object based on the distance data detected by the image-measured distance detector and the distance data detected by the laser-measured distance detector. The three-dimensional object recognition device recognizes the object by coordinating the distance data and by making the distance data of a horizontal direction ineffective, when the two sets of distance data have a width within a present value and the difference between the distance values of the two sets of distance data is within a preset distance value.

16 Claims, 8 Drawing Sheets

MONITOR SYSTEM OF VEHICLE OUTSIDE AND THE METHOD THEREOF

The disclosure of Japanese Patent Application No. 2001-338094 filed on Nov. 2, 2001 including the specification, drawings and abstract is incorporated herein by reference in its entirety.

BACKGROUND OF THE INVENTION

1. Field of the Invention

The present invention relates to a monitor system of vehicle outside for detecting a distance between a vehicle and a three-dimensional object existing in front of the vehicle based on information from an image and an information derived from a laser radar, and to method of monitoring of vehicle outside.

2. Description of the Related Art

Recently, technologies relating to an advanced safety vehicle (ASV) have been positively developed and some of the technologies have been in practical use. The advanced safety vehicle includes a TV camera, a laser radar, and like mounted thereon, detects preceding vehicles and obstructs, determines a degree of danger of collision therewith, and gives an alarm to a driver. And the vehicle is stopped by being automatically applied with a brake or automatically increases or decreases its running speed so as to keep a safe distance between the vehicle and a preceding vehicle.

Incidentally, when a distant three-dimensional object is recognized in these technologies by coordinating the distance data obtained by an image from cameras with the distance data from a laser radar, there is a possibility that a single object is erroneously recognized as a plurality of different objects. The measurement errors in the image and the laser radar are caused by the difference between the characteristics of the distance data obtained by the image and the characteristics of the distance data obtained by the laser radar. For example, when the distance of a distant preceding vehicle is detected by the laser radar, the laser radar mainly detects the reflectors of the vehicle. On the contrary, the distance of the vehicle detected by the image has a large measurement error, and the vehicle may be detected as if there is a three-dimensional object at a farther position. When the difference between the distance data obtained by the image and the distance data obtained by the laser radar is increased as described above, a single three-dimensional object is calculated as if it is a plurality of three-dimensional objects, from which a problem is arisen in that an unnecessarily long calculation time is required.

SUMMARY OF THE INVENTION

An object of the present invention, which was made in view of circumstances described above, is to provide a monitor system of vehicle outside capable of promptly and accurately recognizing a three-dimensional object existing in front of the vehicle based on the information from an image and the information from a laser radar without executing unnecessary processing, and to provide a method of monitoring of a vehicle outside.

The monitor system of vehicle outside includes image-measured distance detection means for detecting the distance data between the vehicle and a three-dimensional object existing in front of the vehicle based on the information of an image in front of the vehicle, laser-measured distance detection means for detecting the distance data between the vehicle and the three-dimensional object existing in front of the vehicle based on the information of a laser radar for projecting a laser beam from the vehicle. Further, the monitor system includes three-dimensional object recognition means for recognizing the three-dimensional object existing in front of the vehicle based on the distance data detected by the image-measured distance detection means and the distance data detected by the laser-measured distance detection means.

With this arrangement, the three-dimensional object recognition means coordinates the distance data detected by the image-measured distance detection means with the distance data detected by the laser-measured distance detection means. The two sets of the distance data existing in a horizontal direction and detected by the laser-measured distance detection means have a width within a preset value and the difference between the distance values of the two sets of the distance data is within a preset distance value. Under the above conditions, the three-dimensional object recognition means recognizes the three-dimensional object by making the distance data, which exist between the two sets of distance data at the positions farther than the positions of the two sets of the distance data by a predetermined distance and which are detected by the image-measured distance detection means ineffective.

The above and other objects, features and advantages of the present invention will become more clearly understood from the following description by referring to the accompanying drawings.

DETAILED DESCRIPTION OF THE PREFERRED EMBODIMENTS

An embodiment of the present invention will be described below with reference to FIGS. 1 to 10.

Figure 1:
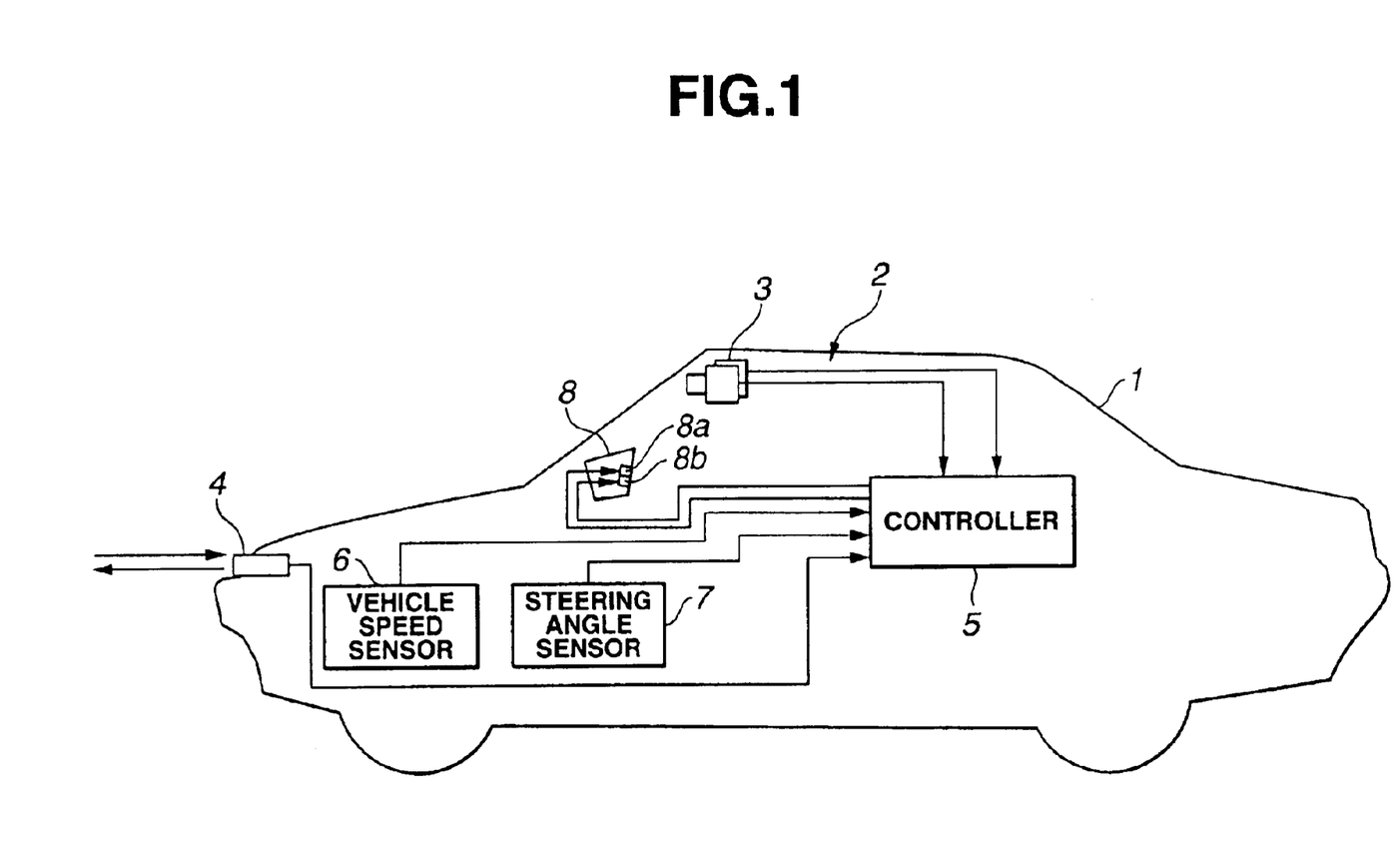
FIG. 1 is a view showing a schematic arrangement of a vehicle drive assist apparatus equipped with a monitor system of vehicle outside.

In FIG. 1, reference numeral 1 denotes a vehicle (vehicle of interest) 1 such as an automobile, and the like, and a vehicle drive assist apparatus (ADA apparatus) 2 is mounted on the vehicle 1 to decide a possibility of collision and contact of the vehicle 1 with a preceding three-dimensional object and to give an alarm when necessary.

Note that while the ADA apparatus 2 generally has a deviation from lane preventing function, and the like, in addition to the collision/contact preventing function, the embodiment of the present invention will explain only the collision/contact preventing function and the explanation of the other functions will be omitted.

The ADA apparatus 2 includes a pair of (right and left) CCD cameras 3, 3, each of which uses a solid state image pickup device, for example, a charge coupled device (CCD) and the like as a three-dimensional optical system. The right and left CCD cameras 3, 3 are mounted on a ceiling of a passenger compartment on the front side thereof with a predetermined interval, record an object outside of the vehicle 1 three-dimensionally from different fields of view, and input images of recorded objects to a controller 5.

Further, a laser projection unit 4 is mounted on the upper portion of a bumper structural member of the vehicle 1 and connected to the controller 5. The laser projection unit 4 includes a laser head having a function for projecting and receiving a laser beam and the function for scanning the laser beam in a right and left directions. The laser beam is projected from the laser projection unit 4 horizontally, and only three-dimensional objects located at positions higher than a road surface are detected therewith. The laser beam from the laser projection unit 4 repeats a motion for detecting distances in such a manner that it is projected and received within a predetermined range at predetermined intervals by being scanned in the right and left direction and, the two-dimensional distribution of the three-dimensional objects is measured.

Figure 3:
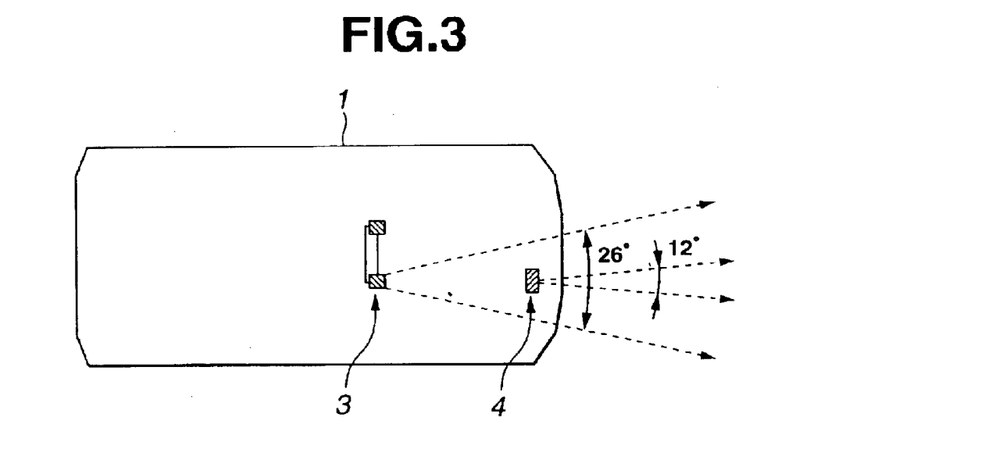
FIG. 3 is the view explaining a detection of distance data executed by CCD cameras and the detection of the distance data executed by a laser radar.

In this embodiment, each CCD camera 3 supplies the images forward of the vehicle 1 within a horizontal range of 26° to the controller 5, whereas the laser projection unit 4 executes a scan in 80 directions at intervals of 0.15°, and supplies the data forward of the vehicle 1 within a horizontal range of 12° in every 0.1 sec. period to the controller 5, as shown in, for example, FIG. 3.

Further, the vehicle 1 includes a vehicle speed sensor 6 for detecting a vehicle speed V and a steering angle sensor 7 for detecting a steering angle δ. The vehicle speed V and the steering angle δ are supplied to the controller 5.

The controller 5 is supplied with the images from the CCD cameras 3, the result of the scan executed by the laser projection unit 4, the vehicle speed V, and the steering angle δ and independently determines the distances of a preceding three-dimensional object based on the images from the CCD cameras 3 and the result of the scan executed by the laser projection unit 4, respectively. Then, the controller 5 coordinates the data of these distances and finally determines the distance to the preceding three-dimensional object based on the coordinated data, decides a risk of the collision and a possibility of the contact of the vehicle 1 with the preceding three-dimensional object, and gives an alarm, when necessary by lighting a collision alarm lamp 8a of a combination meter 8. Further, the controller 5 determines the state in which the distance to the preceding three-dimensional object is detected based on the images from the CCD cameras 3 and the state in which the distance to the preceding three-dimensional object is detected based on the result of the scan executed by the laser projection unit 4, that is, the controller 5 determines the deterioration of the detecting capabilities of the CCD cameras 3 and the laser projection unit 4. Then, when the detecting capabilities of them are deteriorated, the controller 5 notifies a driver of it by lighting a detected state display lamp 8b of the combination meter 8.

Figure 2:
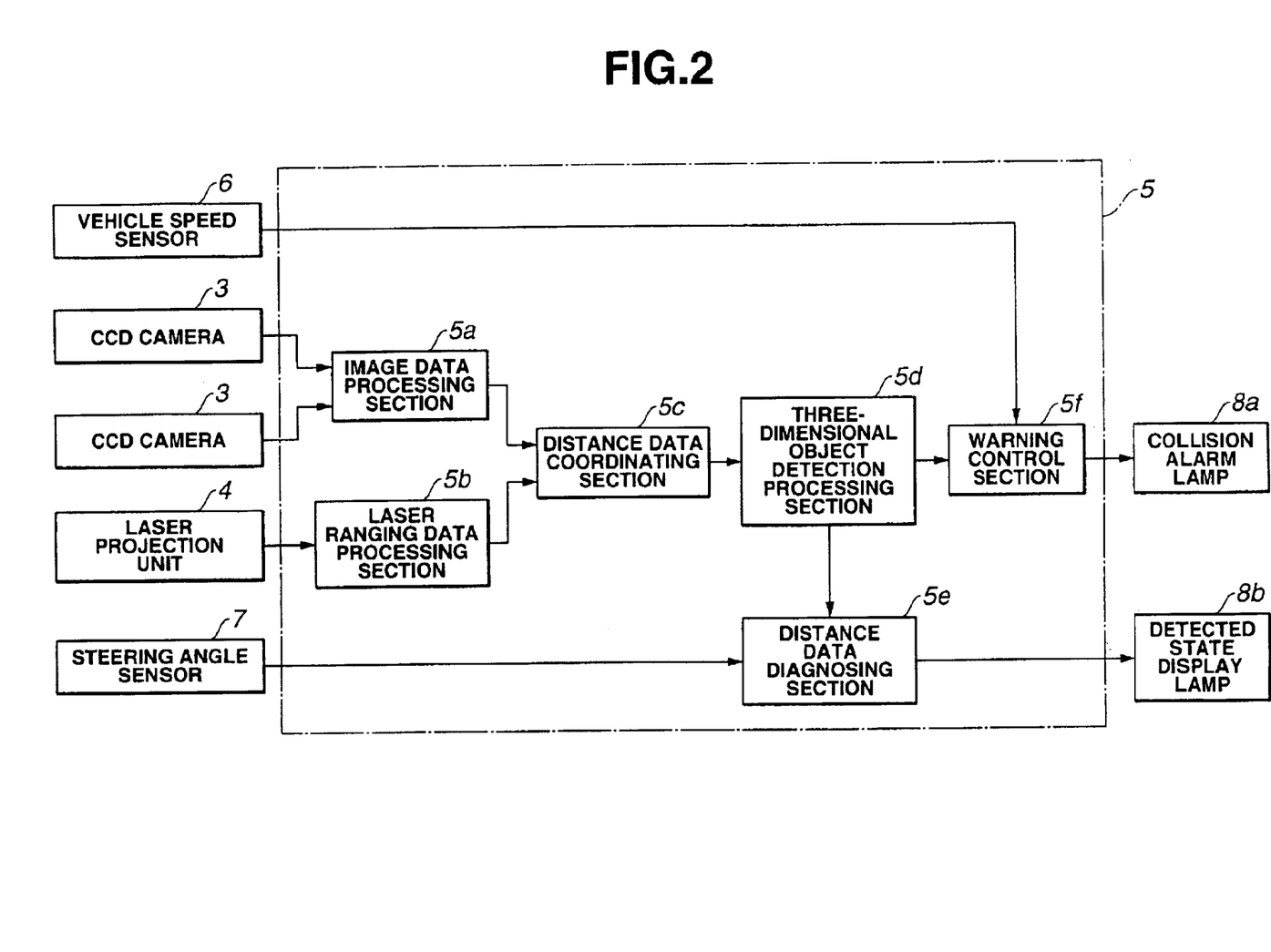
FIG. 2 is a block diagram showing a function of the vehicle drive assist apparatus.

That is, the controller 5 is arranged to have a function as an outside of a vehicle monitor and composed of an image data processing section 5a, a laser ranging data processing section 5b, a distance data coordinating section 5c, a three-dimensional object detection processing section 5d, a distance data diagnosing section 5e, and a warning control section 5f, as shown in FIG. 2.

The image data processing section 5a is provided as image-measured distance detection means, equally divides the image from each CCD camera 3 into 128 segments in a right and left direction, and sets an array C zln corresponding to the thus divided image. Then, the image data processing section 5a determines a typical number of dislocated pixels for each segment, calculates the distances to the three-dimensional object by the number of dislocated pixels and stores the distances as distance data measured by the image (hereinafter, referred to as "image-measured distance data") C zln [0-127]. For example, C zln[3] shows the distance data of a segment No. 3, and when the distance data is ineffective data, it is shown by 999000.

The laser ranging data processing section 5b is provided as laser-measured distance detection means and calculates the distance to an object by a period of time necessary from a time the laser beam is projected to a time the laser beam is received. Further, the laser ranging data processing section 5b calculates the two-dimensional position of the object (80 sections in total) from the direction in which the laser beam is projected and stores it as distance data measured by the laser beam (hereinafter, referred to as laser-measured distance data) L zln[0-79]. For example, L zln[3] shows the distance data of a segment No. 3, and when the distance data is ineffective data, it is shown by 999000.

The distance data coordinating section 5c transforms the 80 segments of the laser-measured distance data L zln [0-79] to the coordinate of the 128 segments of the image-measured distance data (laser-measured distance data lzrzln [0-127]), and coordinates the thus transformed laser-measured distance data lzrzln [0-127] with the image-measured distance data C zln[0-127].

A transformation of the laser-measured distance data L zln [0-79] to the laser-measured distance data lzrzln[0-127] is executed by, for example, the operation of an x-coordinate and a z-coordinate as shown below.

$$\text{x-coordinate} = \text{laser-measured distance data} \cdot \sin k[k-kv+50] + \text{x-coordinate of laser head} \qquad (1)$$

$$\text{z-coordinate} = \text{laser-measured distance data} + \text{z-coordinate of laser head} \qquad (2)$$

where, sink[k] shows a data table of sin ((k−50)·0.155°), k=(laser segment number where center axis of laser head exits)−(image segment number where center axis of laser beam exists), and "50" shows a segment No. of center of data table, and 0.155 shows one step of 80 segments of the laser beam.

Further, the transformed laser-measured distance data lzrzln [0-127]) is coordinated with the image-measured distance data C zln[0-127] as described below. Note that fln in [fln] shows each of 0-127 segments.

1. When the laser-measured distance data lzrzln[fln] is effective and a long distance data (20 m or more), a final distance data zln[fln] is set to the laser-measured distance data lzrzln[fln]. That is, zln[fln]=lzrzln[fln].

2. When the laser-measured distance data lzrzln[fln] is effective and intermediate distance data (10 m or more to less than 20 m) and the image-measured distance data C zln[fln] is effective as well as the difference between the image-measured distance data C zln[fln] and the laser-measured distance data lzrzln[fln] is within a predetermined value (for example, 2.5 m), the final distance data zln[fln] is set to the average value of the laser-measured distance data lzrzln[fln] and the image-measured distance data C zln[fln]. That is, zln [fln]=(lzrzln[fln]+C zln[fln])/2.

3. When the laser-measured distance data lzrzln[fln] is effective and the intermediate distance data (10 m or more to less than 20 m), the final distance data zln[fln] is set to the laser-measured distance data lzrzln[fln] except the above case 2. That is, zln[fln]=lzrzln[fln].

4. When the laser-measured distance data lzrzln[fln] is effective and short distance data (3 m or more to less than 10 m), the final distance data zln[fln] is set to the image-measured distance data C zln[fln]. That is, zln [fln]=C zln[fln].

5. When the laser-measured distance data lzrzln[fln] is effective and very short distance data (less than 3 m), the final distance data zln[fln] is set to the laser-measured distance data lzrzln[fln]. That is, zln[fln]= lzrzln[fln].

6. When the laser-measured distance data lzrzln[fln] is ineffective, the final distance data zln[fln] is set to the image-measured distance data C zln[fln]. That is, zln [fln]=C zln[fln].

In general, the distance data based on an image has a large error when an object is located at a far distant position, whereas it has a small error when the object is located at a near position. Further, when the object is located at a very near position, the preceding object is liable to be captured beyond a rear gate. Further, the distance data based on the laser radar has a relatively small error when the object is located at the far distant position, whereas it has a large error when the object is located at the near position. Accordingly, the data to be finally employed is previously selected as described in the above items 1 to 6 so that accurate distance data can be finally obtained.

Then, the image-measured distance data C zln[0-127] are stored and output as zln1[0-127], and the transformed laser-measured distance data lzrzln[0-127] are stored and output as zln2[0-127]. Further, coordinated final distance data zln [0-127] are output to the three-dimensional object detection processing section 5d. That is, the distance data coordinating section 5c is provided as a final distance setting means.

The three-dimensional object detection processing section 5d eliminates the singular points at the positions less than 40 m and the singular points at the positions equal to or more than 40 m, further detects the corner points of the three-dimensional object and a corner-shaped three-dimensional object based on the result of previous detection of the three-dimensional object, and recognizes the three-dimensional object by subjecting the final distance data zln[0-127] to a grouping processing. Accordingly, three-dimensional object recognition means is composed of the distance data coordinating section 5c and the three-dimensional object detection processing section 5d.

Specifically, in the elimination of the singular points at the points less than 40 m, the three-dimensional object detection processing section 5d eliminates distant three-dimensional objects, which are located between three-dimensional sections having approximately the same distance from the vehicle 1, as the singular points in such a situation that the three-dimensional objects are complicatedly mixed and the distant three-dimensional objects can be observed from between near three-dimensional objects.

Figure 5:
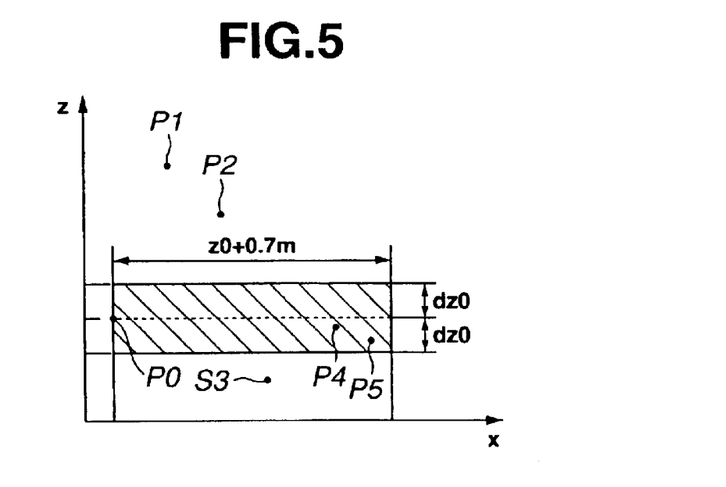
FIG. 5 is the view explaining singular points to be eliminated.

That is, as shown in FIG. 5, the three-dimensional object detection processing section 5d sets the final distance data zln[fln], which are located at a position less than 40 m, as a reference point P0 (z0, x0), and determines the point, which satisfies all of the following conditions, as the point having the same distance, and eliminates distant points located between these two points as the singular points. Note that the distance data of the points to be eliminated are substituted by 999000 similarly to ineffective data.

In the example of FIG. 5, points P4 and P5, which exist in a hatched region, are recognized as the points located at equal distances with respect to the reference point P0. The z-direction and the x-direction of the hatched region are set, for example, as shown below.

z-direction: reference point±dz0 (=z0·(164/4096)+200) mm x-direction: reference point+0.7 m Accordingly, in the example of FIG. 5, points P1 and P2 located at positions farther than the hatched region are eliminated as the singular points, whereas a point P3 located at the position nearer than the hatched region is not eliminated. As described above, the singular points of the final distance data zln[fln] located at the position less than 40 m are eliminated regardless of whether the distance data is based on the image or based on the laser radar, thereby data processing is simplified.

Further, in the elimination of the singular points at the positions farther than 40 m, when the distant three-dimensional object is detected, the distance data measured by the laser radar shows the right and left reflectors of the preceding vehicle. Accordingly, the distance data of an image located between the right and left reflectors is eliminated as the singular point.

Figure 4:
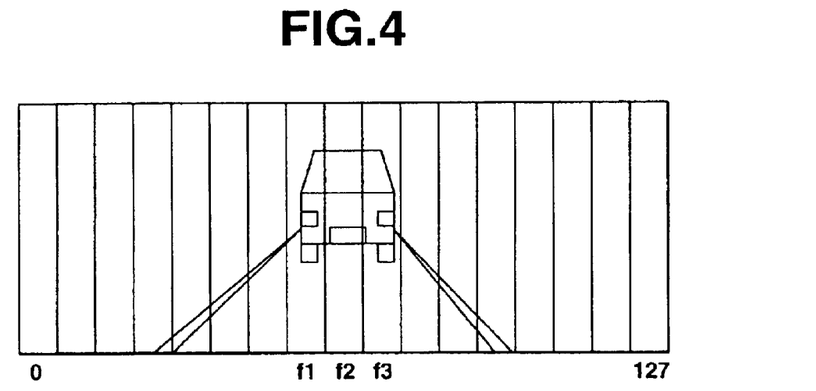
FIG. 4 is the view explaining a division of image-measured distance data.

For example, when the final distance data zln[0-127] is obtained as shown in FIG. 4 and segments f1 and f3 satisfy all the conditions described below at the time, it is determined that the segments f1 and f3 show the reflectors of the preceding vehicle.

1. The segments f1 and f3 are the distance data obtained by the laser radar.
2. The value of the segment f1 is 40 m or more.
3. The difference between the segments f1 and f3 is ±0.5 m or less in a longitudinal direction.
4. The interval between the segments f1 and f3 is 2 m or less in a lateral direction.

Then, when the segment f2 satisfies the following two conditions, the distance data of the segment f2 is eliminated as the singular point and substituted with 999000.

1. The segment f2 is distance data obtained by the image.
2. The segment f2 is located at a position farther than the segment f1.

As described above, when the distance of the preceding vehicle is detected by the laser radar in the distance data of 40 m or more, the laser radar detects the distance mainly by the reflectors of the preceding vehicle. Thus, the three-dimensional object can be recognized accurately and promptly by eliminating the distance data, which exists between the distance data measured by the laser radar, of a more distant image as the singular point when it is determined that the distance data is not necessary or that it has a large error.

Then, the three-dimensional object detection processing section 5d provides a survey area using the corner point of a corner-shaped three-dimensional object detected last time as the center of the survey area and examines the final distance data zln[0-127] from which the singular points detected this time as described above are eliminated to thereby detect whether or not a new corner point exists.

Thereafter, the three-dimensional object detection processing section 5d groups the data, that is, determines a threshold value, groups zln [fln] in the threshold value, extracts side wall data from the inclination, and the like of the grouped data, and detect the three-dimensional object and a side wall by dividing and coordinating the grouped data. As described above, the information of the detected three-dimensional object is supplied to the distance data diagnosing section 5e and to the warning control section 5f.

The distance data diagnosing section 5e determines whether the finally detected three-dimensional object is detected in both the image-measured distance data C zln[0-127] (zln1[0-127]) and the transformed laser-measured distance data lzrzln[0-127] (zln2[0-127]). When the finally detected three-dimensional object is not detected by the image-measured distance data zln1[0-127], the distance data diagnosing section 5e determines that a capability for measuring a distance by the image is deteriorated and notifies the driver of it by lighting the detected state display lamp 8b of the combination meter 8 as prescribed. Further, when the finally detected three-dimensional object is not detected by the laser-measured distance data zln2[0-127], the distance data diagnosing section 5e determines that the capability for measuring the distance by the laser is deteriorated and notifies the driver of it by lighting the detected state display lamp 8b of the combination meter 8 as prescribed.

The distance measuring capability is determined when the vehicle 1 travels on an approximately straight road at a steering angle of −10° to +10°. This is because when the distance is measured by a laser radar, it is difficult to recognize the three-dimensional object because a laser beam is projected at an inclined angle and cannot be reflected, while a guard rail and a side wall can be recognized when the distance is measured by the image.

Further, the survey area of the three-dimensional object in which the distance measuring capability is determined is set in an area where the field of view of the laser radar overlaps that of the image, and the three-dimensional object, which exists 40 to 70 m ahead of the vehicle 1 and has a width of 50 cm or more, is used as the three-dimensional object for determining the distance measuring capability. The reason why the three-dimensional object existing 40 to 70 m ahead of the vehicle 1 is used resides in that when the three-dimensional object existing farther than the above distances is also used for the determination, the error of the distance data obtained by the image and the error of the distance data obtained by the laser radar are increased. Further, this is because that the distance measuring capability cannot be determined by the distance data of a forward three-dimensional object locating at a position less than 40 m ahead of the vehicle 1 because the deterioration of the distance measuring capability of the three-dimensional object is very small. Furthermore, the reason why the three-dimensional object having the width of 50 cm or more is used resides in that when there are a plurality of the preceding vehicles, the three-dimensional object may erroneously recognized in a vacant space between the three-dimensional objects in the image.

Then, the distance data diagnosing section 5e determines whether or not the image-measured distance data zln1[0-127] exists with respect to the three-dimensional object, and when the image-measured distance data does not exist, the three-dimensional object is counted to the number of the three-dimensional objects without image n1. Likewise, the distance data diagnosing section 5e determines whether or not the laser-measured distance data zln2[0-127] exists with respect to the three-dimensional object, and when the laser-measured distance data does not exist, the three-dimensional object is counted to the number of the three-dimensional objects without a laser n2. With this manner, a three-dimensional object non-detection ratio of image is calculated from the total number n0 of the three-dimensional objects to be processed and the number of the three-dimensional objects without image n1 (=(n1/n0)·100%), thereby the three-dimensional object non-detection ratio of the laser radar is calculated (=(n2/n0)·100%).

Then, when the three-dimensional object non-detection ratio by the image is equal to or more than a preset detection ratio threshold value k6, the distance data diagnosing section 5e increments an image capability determination timer, whereas when it is less than the detection ratio threshold value k6, the distance data diagnosing section 5e decrements the image capability determination timer. Thus, when the value of the capability determination timer exceeds a preset output threshold value k1, the distance data diagnosing section 5e determines that the distance measuring capability of image is deteriorated and lights the detected state display lamp 8b as prescribed. Further, when the value of the capability determination timer is equal to or less than a preset elimination threshold value k2 (<k1), the distance data diagnosing section 5e extinguishes the detected state display lamp 8b being lit.

Likewise, when a three-dimensional object non-detection ratio of laser radar is equal to or more than a preset detection ratio threshold value k5, the distance data diagnosing section 5e increments a laser radar capability determination timer, whereas when it is less than the detection ratio threshold value k5, the distance data diagnosing section 5e decrements the laser radar capability determination timer. When the value of the capability determination timer exceeds a preset output threshold value k3, the distance data diagnosing section 5e determines that the distance measuring capability of the laser radar is deteriorated and lights the detected state display lamp 8b as prescribed. Further, when the value of the capability determination timer is equal to or less than a preset elimination threshold value k4 (<k3), the distance data diagnosing section 5e extinguishes the detected state display lamp 8b being lit.

As described above, the deterioration of the distance measuring capabilities of the image and the laser radar is determined depending on whether or not there are the distance data of the image and the laser radar that detect a finally detected three-dimensional object in this embodiment. Accordingly, it is possible to promptly and accurately determine the deterioration of the distance measuring capabilities of the image and the laser radar.

The warning control section 5f extracts other vehicles, obstructs, and the like existing on the right and left lanes adjacent to the lane of the vehicle 1 based on the three-dimensional object information from the three-dimensional object detection processing section 5d, the vehicle speeds V from the vehicle speed sensor 6, and the like. Then, the warning control section 5f decides the possibility of the collision and contact of the other vehicles, the obstacles, and the like with the vehicle 1 from the positions and sizes of the thus extracted objects, the relative speeds of them to the vehicle 1 determined from the positional changes with time, and the like. As a result, the warning control section 5f gives the alarm when necessary by lighting the collision alarm lamp 8a of the combination meter 8.

Figure 6:
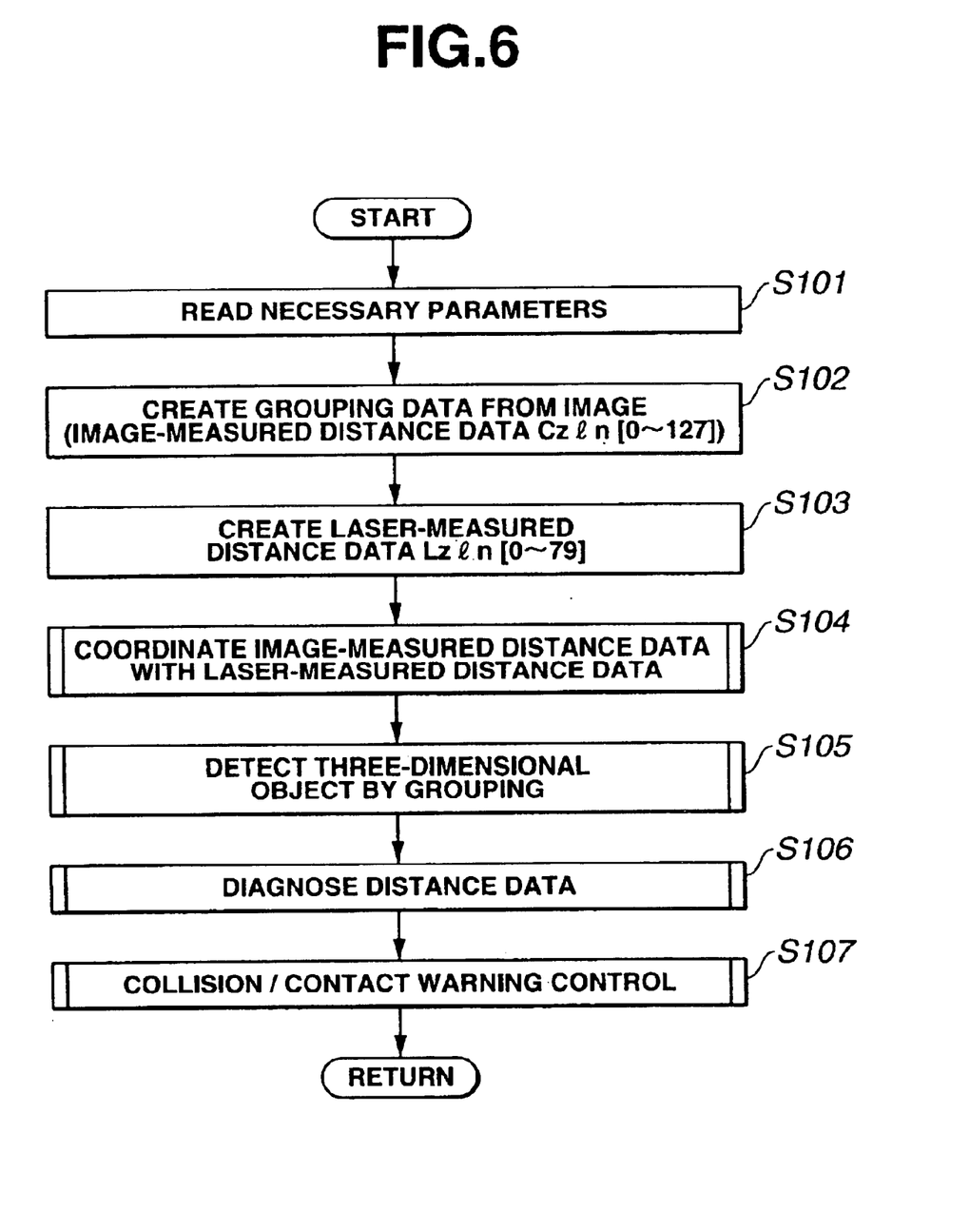
FIG. 6 is a flowchart of a forward monitor program.

Next, a forward monitor program executed by the controller 5 described above will be described below using the flowcharts of FIGS. 6 to 10. FIG. 6 is a flowchart showing the overall flow of the forward monitor program. First, necessary parameters are read at step (hereinafter, abbreviated as "S") 101.

Then, a process goes to S102 and creates the grouping data (image-measured distance data C zln[0-127]) from the image. That is, the image data processing section 5a equally divides the image from each CCD camera 3 into 128 segments in a right and left direction as shown in FIG. 4, and sets an array C zln corresponding to the segments. Then, the image data processing section 5a determines a typical number of dislocated pixels for each segment, calculates the distance to the three-dimensional object from the number of dislocated pixels and stores the distance as image-measured distance data C zln[0-127]. For example, C zln[3] shows the distance data of a segment No. 3, and when the distance data are ineffective data, it is shown by 999000.

Next, the process goes to S103, and the laser ranging data processing section 5b creates laser-measured distance data L zln[0-79]. That is, the laser ranging data processing section 5b calculates the distance to the object by a period of time necessary from a time a laser beam is projected to a time the laser beam is received. Further, the laser ranging data processing section 5b calculates the two-dimensional position (80 segments in total) of the object from a direction where the laser beam is projected. For example, L zln[3] shows the distance data of the segment No. 3, and when the distance data is ineffective data, it is shown by 999000.

Figure 7:
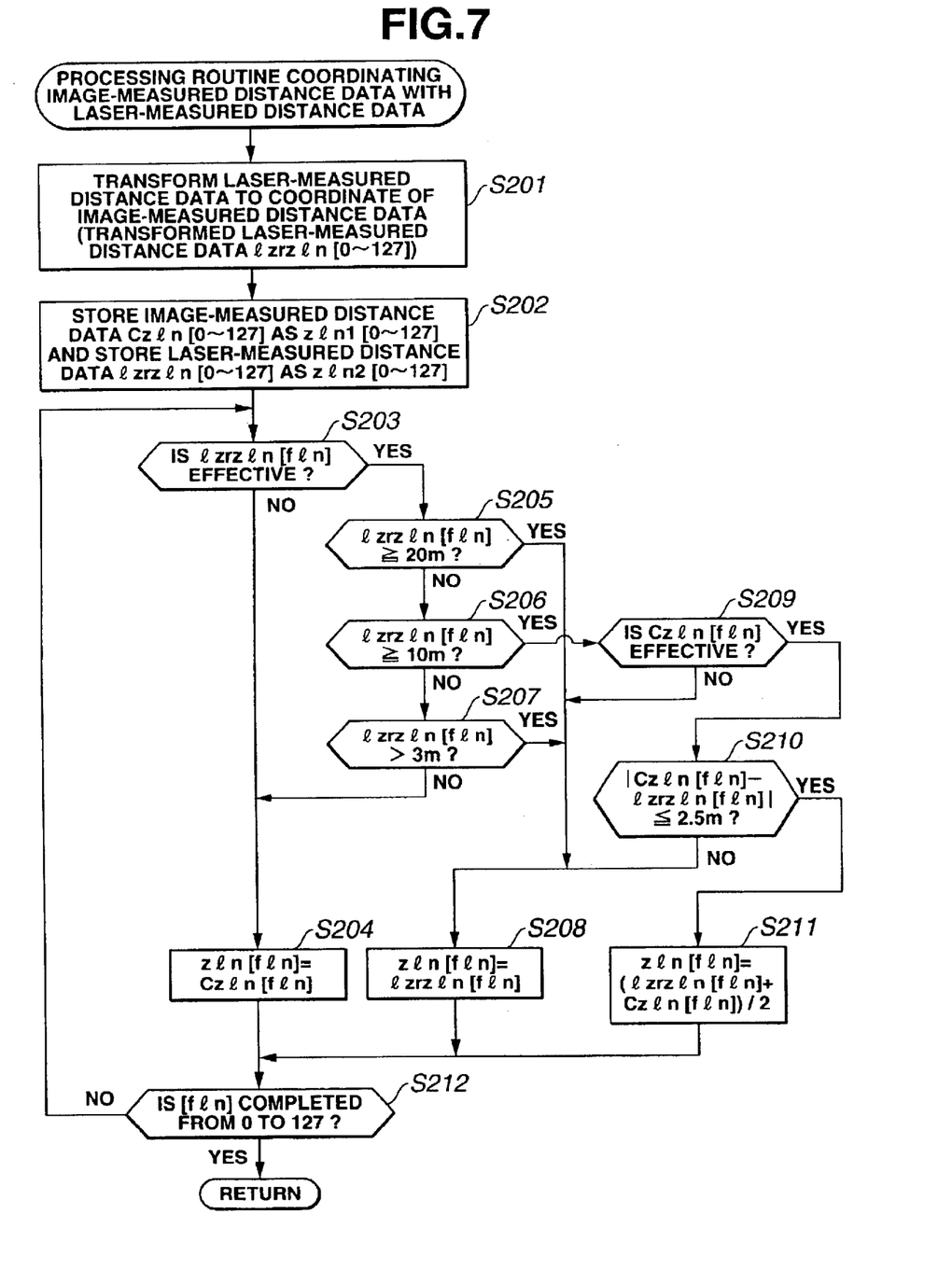
FIG. 7 is the flowchart of a processing routine for coordinating the image-measured distance data with radar-measured distance data.

Thereafter, when the process goes to S104, the image-measured distance data shown in the flowchart of FIG. 7 is coordinated with the laser-measured distance data shown in the flowchart of FIG. 7.

In the flowchart of FIG. 7, first, at S201, the distance data coordinating section 5c transforms the 80 segments of the laser-measured distance data L zln[0-79] to the coordinate of the 128 segments of image-measured distance data (laser-measured distance data lzrzln[0-127]). The laser-measured distance data L zln[0-79] is transformed to the laser-measured distance data lzrzln[0-127] by, for example, Equations (1) and (2) described above.

Subsequently, the process goes to S202 and stores the image-measured distance data C zln[0-127] as zln1[0-127] and stores the transformed laser-measured distance data lzrzln[0-127] as zln2[0-127], and then the process goes to S203.

At S203, it is determined whether or not the laser-measured distance data lzrzln[fln] of a segment to be handled is effective. Note that, hereinafter, [fln] shows the segment of data to be handled, and the data is divided into 128 segments from 0 to 127 in correspondence to S212 that will be described later.

When the laser-measured distance data lzrzln[fln] is ineffective as the result of the determination at S203, the process goes to S204 and sets final distance data zln[fln] to the image-measured distance data C zln[fln]. That is, zln[fln]=C zln[fln].

Further, when the laser-measured distance data lzrzln[fln] is effective as the result of the determination at S203, the process goes to S205 and determines whether or not the laser-measured distance data lzrzln[fln] is located at a long distance position (20 m or more).

When the laser-measured distance data lzrzln[fln] is not located at the long distance position (20 m or more) as the result of the determination at S205, the process goes to S206 and determines whether or not the laser-measured distance data lzrzln[fln] is located at an intermediate distance position (10 m or more to less than 20 m).

When the laser-measured distance data lzrzln[fln] is not located at the intermediate distance position (10 m or more to less than 20 m), the process goes to S207 and determines whether or not the laser-measured distance data lzrzln[fln] is located at a short distance position (3 m or more to less than 10 m) or at a very short distance position (less than 3 m).

In the determinations from S205 to S207 described above, first, when it is determined at S205 that the laser-measured distance data lzrzln[fln] is located at the long distance position (20 m or more), the process goes to S208, and the final distance data zln[fln] is set to the laser-measured distance data lzrzln[fln] that has a relatively small error at the long distance position. That is, zln[fln]=lzrzln[fln].

Further, in the determinations from S205 to S207 described above, when it is determined at S206 that the laser-measured distance data lzrzln[fln] is located at the intermediate distance position (10 m or more to less than 20 m), the process goes to S209 and determines whether or not the image-measured distance data C zln[fln] is effective. When the image-measured distance data C zln[fln] is ineffective, the process goes to S208 and the final distance data zln[fln] is set to the laser-measured distance data lzrzln[fln]. That is, zln[fln]=lzrzln[fln].

Further, when the image-measured distance data C zln[fln] is effective at step S209, the process goes to S210 and determines whether or not the difference between the image-measured distance data C zln[fln] and the laser-measured distance data lzrzln[fln] is equal to or less than 2.5 m. When the difference is equal to or larger than 2.5 m, the process goes to S208 and sets the final distance data zln[fln] to the laser-measured distance data lzrzln[fln]. That is, zln[fln]=lzrzln[fln].

Further, when the difference between the image-measured distance data C zln[fln] and the laser-measured distance data lzrzln[fln] is less than 2.5 m, the process goes to S211 and sets the final distance data zln[fln] to the average value of the laser-measured distance data lzrzln[fln] and the image-measured distance data zln[fln]. That is, zln[fln]=(lzrzln[fln]+C zln[fln])/2.

In contrast, in the determinations from S205 to S207 described above, when it is determined at S207 that the laser-measured distance data lzrzln[fln] is located at the short distance position (3 m or more to less than 10 m), the process goes to step S204 and sets the final distance data zln[fln] to the image-measured distance data C zln[fln] that has a relatively small error at the short distance position. That is, zln[fln]=C zln[fln].

Further, when it is determined at S207 that the laser-measured distance data zln[fln] is located at the very short distance position (less than 3 m), the process goes to S208 and sets the final distance data zln[fln] to the laser-measured distance data lzrzln[fln]. That is, zln[fln]=lzrzln[fln].

After the final distance data zln[fln] is set as shown at S204, S208, and S211, the process goes to S212 and determines whether or not the coordinate processing is completed to the laser-measured distance data lzrzln[fln] of all the 128 segments from 0 to 127. When the coordinate processing is completed, the process escapes from the routine, whereas when the coordinate processing is not completed, the processing steps from S203 to S211 described above are repeated to the following segments.

As described above, according to the coordinate processing of the image-measured distance data with the laser-measured distance data of this embodiment, data having a smaller error is preferentially used depending upon a previously detected distance. Accordingly, a distance measured by the laser radar is promptly coordinated with a distance measured by the image in an optimum manner without executing a complicated calculation, thereby the result of the coordination can be promptly output as the data of a forward three-dimensional object.

Figure 8:
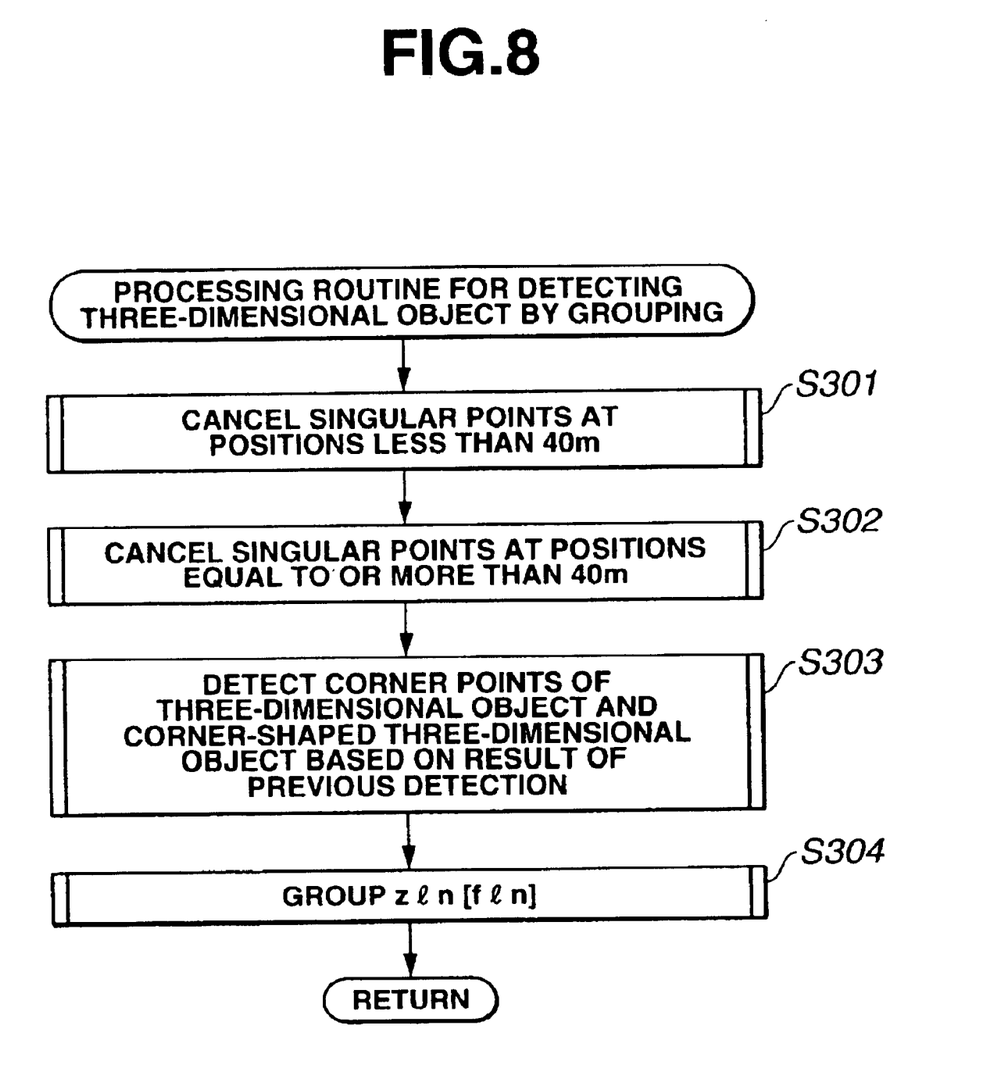
FIG. 8 is the flowchart of a processing routine for detecting a three-dimensional object by grouping.

After the image-measured distance data is coordinated with the laser-measured distance data at S104 described above, the process goes to step S105 and detects a three-dimensional object by the grouping shown in FIG. 8.

In the flowchart of FIG. 8, first, the three-dimensional object detection processing section 5d eliminates the singular points located at positions less than 40 m at step S301. That is, the distant three-dimensional objects, which are located between the three-dimensional sections having approximately the same distance from the vehicle 1, are eliminated as the singular points in such a situation that the three-dimensional objects are complicatedly mixed and the distant three-dimensional objects are observed from between near three-dimensional objects. As shown in FIG. 5, the final distance data zln[fln], which is located at a position less than 40 m, is set as a reference point P0 (z0, x0), and the point, which satisfies all of the following conditions, is determined as a point having the same distance, and the distant points between these two points are eliminated as the singular points. Note that the distance data of the points to be eliminated is substituted by 999000 similarly to the ineffective data. As described above, the singular points of the final distance data zln[fln] located at the position less than 40 m are eliminated regardless of whether the distance data is based on an image or based on a laser radar, thereby data processing is simplified.

Figure 9:
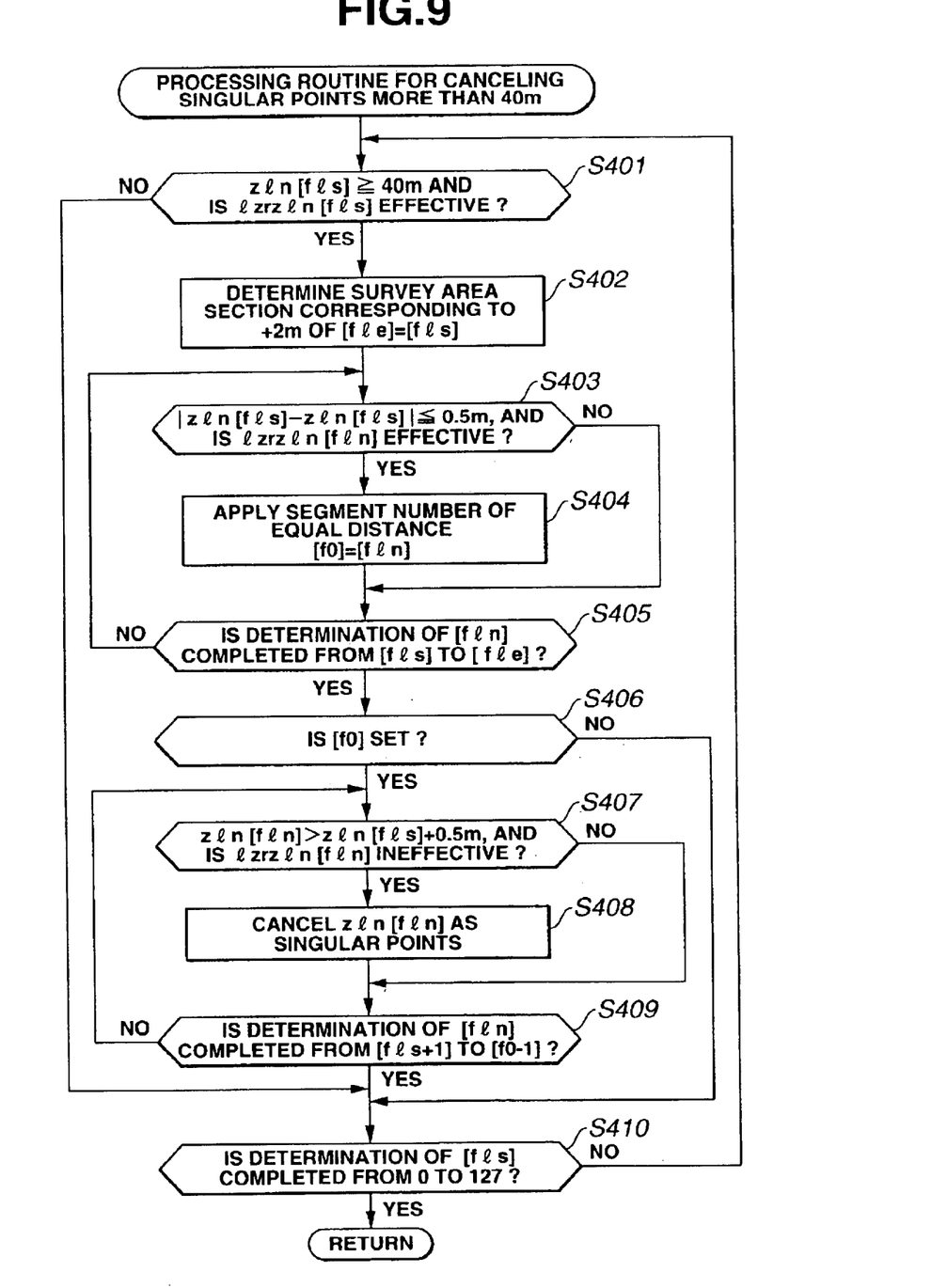
FIG. 9 is the flowchart of a processing routine for eliminating singular points at positions farther than 40 m.

Next, the process goes to step S302 and eliminates the singular points located at the positions of 40 m or more as shown in FIG. 9 which will be described later.

Then, the process goes to S303, at which the three-dimensional object detection processing section 5d sets a survey area using the corner point of the corner-shaped three-dimensional object detected last time as the center of the survey area, and examines the final distance data zln[0-127], which is detected this time and from which the singular points are eliminated at S301 and S302, to thereby detect whether or not a new corner point exists.

Thereafter, the process goes to S304, at which the three-dimensional object detection processing section 5d groups the data, that is, determines a threshold value, groups the final distance data zln[fln] that exists in the threshold value, extracts side wall data from the inclination, and the like of the grouped data, and divides and coordinates the grouped data to thereby detect the three-dimensional object and a side wall.

As shown in the flowchart of FIG. 9, in the processing step executed at S302 for eliminating the singular points located at the positions of 40 m or more, first, it is determined at S401 whether or not the distance data zln[fls] of the segments to be handled is the data of 40 m or more as well as whether or not the laser-measured distance data lzrzln[fls] of the segments is effective. Note that, hereinafter, [fls] shows the segments of data to be handled, and the data is divided into 128 segments from 0 to 127 in correspondence to S410 that will be described later.

Then, the process jumps to S410 when the result of the determination at S401 shows at least any one of that the distance data zln[fls] is less than 40 m and that the laser-measured distance data lzrzln[fls] of the segments is ineffective. Then, it is determined at step 410 whether or not the processing of the distance data zln[fls] of all the 128 segments from 0 to 127 to be handled is completed. When the processing is completed, the process, escapes from the routine, whereas when it is not completed, the processing steps from S401 are executed again as to the following segments.

When it is determined that the distance data zln[fls] is the data of 40 m or more as well as that the laser-measured distance data lzrzln[fls] of the segments are effective as the result of determination at S401, the process goes to S402 and determines a survey area using the laser-measured distance data lzrzln[fls] of the segments as a reference, and the segment is set to the segment zln[fle] of the survey area at the other end thereof in correspondence to the position spaced apart from the data zln[fls] by 2 m in the right direction.

Then, the process goes to S403 and determines whether or not the difference of the distance to zln[fls] is 0.5 m or less in the survey area of the segments from zln[fls] to zln[fle] (that is, |zln[fls]−zln[fln]|≦0.5 m, where [fln] is the segment No. from [fls] to [fle]) as well as determines whether or not the laser-measured distance data lzrzln[fln] thereof are effective.

When the above conditions are satisfied as the result of the determination at S403, the process goes to step S404 and determines that the segment is the segment of the same three-dimensional object of which distance is equal to the distance of zln[fls], and the segment is set as right end segment data zln[f0] corresponding to zln [fls]. That is, f0=f1n.

When the right end segment data zln[f0] corresponding to zln[fls] is set at S404, or when it is determined at S403 that the conditions described above are not satisfied, the process goes to S405 and determines whether or not the determination of all the segment numbers from [fls] to [fle] is completed. When the determination is not completed, the process returns to S403 again and executes the determination as to the following segments from [fls] to [fle].

When the determination of all the segments from [fls] to [fle] is completed at S405, the process goes to S406 and determines whether or not the right end segment data zln[f0] corresponding to zln[fls] is set. When the right end segment data zln[f0] is not set as the result of the determination, the process jumps to S410 and determines the processing steps of the distance data zln[fls] of all the 128 segments to be handled from 0 to 127 are completed. When the processing steps are completed, the process escapes from the routine, whereas when they are not completed, the processing steps from S401 are executed again as to the following segments.

Further, when it is determined at S406 that the right end segment data zln[f0] corresponding to zln[fls] is set, the process go to S407. At step S407, it is determined whether or not the distance data zln[fln] is located at the position farther than zln[fls]+0.5 m as well as whether or not the laser-measured distance data lzrzln[fln] thereof is ineffective in the data of the segments from "fls+1" to "f0−1" (segments from "fls" to "f0").

Then, when the above conditions are satisfied at S407, the process goes to S408 and eliminates the data zln[fln] as the singular points.

When the segments from "fls" to "f0" are eliminated as the singular points at S408 or when the conditions described above are not satisfied at step S407, the process goes to S409 and determines whether or not the determination of all the segments from "fls" to "f0" is completed.

When the determination of all the segments from "fls" to "f0" is not yet completed at S409, the determination of the following segments from "fls" to "f0" is executed from S407. In contrast, when the determination of all the segments from "fls" to "f0" is completed at S409, the process goes to S410 and determines whether or not the processing of all the 128 segments from 0 to 127 is completed. When the processing is completed, the process escapes from the routine, whereas when it is not completed, the process executes processing steps again from S401 as to the following segments.

As described above, when the distance of the preceding vehicle is detected by the laser radar in the distance data of 40 m or more, the laser radar detects the distance mainly by the reflectors of the preceding vehicle. Accordingly, in this embodiment, the three-dimensional object can be recognized accurately and promptly by eliminating the distance data, which exists between the distance data measured by the laser radar, of a more distant image as the singular point when it is determined that the distance data is not necessary or that it has a large error.

Figure 10:
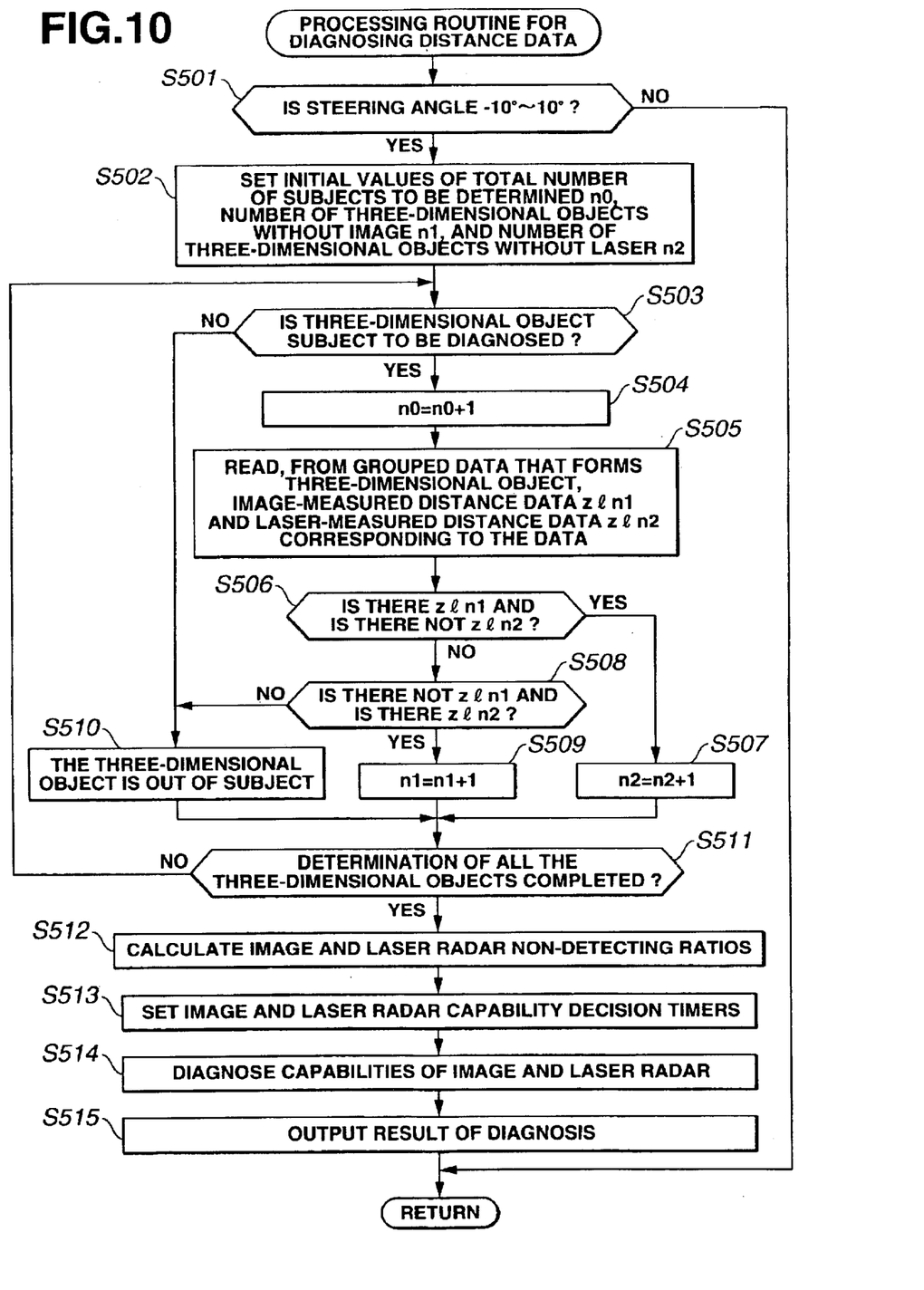
FIG. 10 is the flowchart of the processing routine for diagnosing the distance data.

As described above, after the three-dimensional object is detected at S105 by the grouping shown in FIG. 8, the process goes to S106 and executes the distance data diagnosis processing shown in FIG. 10.

In the flowchart of FIG. 10, first, it is determined at step S501 whether or not the vehicle 1 travels on an approximately straight road at the steering angle set to −10° to 10°. When the steering angle is larger than −10° to 10°, no diagnosis processing is executed, and the process escapes from the routine as it is. This is because when the distance is measured with the laser beam, it is difficult to recognize the three-dimensional object because it is projected at the inclined angle and cannot be reflected thereby, and thus an accurate result of the diagnosis processing cannot be obtained, while a guard rail and the side wall can be recognized when the distance is measured with an image.

When the vehicle 1 travels on the approximately straight road at the steering angle within the range of −10° to 10° as the result of determination at S501, the process goes to S502 and sets the initial value of the total number of the three-dimensional objects to be subjected to determination to n0, the initial value of the number of the three-dimensional objects without image to n1 and the initial value of the number of the three-dimensional objects without the laser radar to n2.

Then, the process goes to S503 and determines whether or not the three-dimensional object is to be diagnosed. This determination is made depending upon whether or not the three-dimensional object is located at a portion where the field of view of the laser radar overlaps the field of view of the image and depending upon whether or not the three-dimensional object exists 40 to 70 m ahead of the vehicle 1 and has a width of 50 cm or more.

When it is determined as the result of determination at S503 that the three-dimensional object does not satisfy the conditions described above and is not to be diagnosed, the process jumps to S510 and determines not to diagnose the three-dimensional object.

In contrast, when it is determined that the three-dimensional object is to be diagnosed as the result of the determination at S503, the process goes to S504 and increments the total number of the three-dimensional objects to be subjected to determination n0 by 1 (n0=n0+1). Then, the process goes to S505 and reads the image-measured distance data zln1 (data stored at S202) and the laser-measured distance data zln2 (data stored at S202) from the grouped data for forming the three-dimensional object in correspondence thereto.

Then, the process goes to S506 and determines whether or not there is the image-measured distance data zln1 corresponding to the three-dimensional object as well as whether or not there is no laser-measured distance data zln2 corresponding to the three-dimensional object. When the above conditions are satisfied, the process goes to step S507 and increments the number of the three-dimensional objects without the laser radar n2 by 1 (n2=n2+1).

Further, when the determination conditions at S506 are not satisfied, the process goes to S508 and determines whether or not there is no image-measured distance data zln1 corresponding to the three-dimensional object as well as whether or not there is the laser-measured distance data zln2 corresponding to the three-dimensional object. When the above conditions are satisfied, the process goes to step S509 and increments the number of the three-dimensional objects without image n1 by 1 (n1=n1+1).

Then, when even the conditions at S508 are not satisfied, that is, there is neither the image-measured distance data zln1 nor the laser-measured distance data zln2 that corresponds to the three-dimensional object or when there are both the image-measured distance data zln1 and the laser-measured distance data zln2 that correspond to the three-dimensional object, the process goes to S510 and excludes the three-dimensional object from the subject to be diagnosed.

After the completion of the processing step at S507, S509, or S510, the process goes to S511 and determines whether or not the determination is executed to all the three-dimensional objects, and when all the three-dimensional objects are not subjected to the determination, the process returns to S503 and repeats the processing steps described above.

When it is determined at S511 that all the three-dimensional objects are subjected to the determination, the process goes from S511 to S512, calculates a three-dimensional object non-detection ratio of the image from the total number of the three-dimensional objects to be subjected to the determination n0 and the number of the three-dimensional objects without the image n1 (=(n1/n0) 100%), and further calculates the three-dimensional object non-detection ratio of the laser radar (=(n2/n0) 100%).

Subsequently, the process goes to S513 and increments the image capability determination timer when the three-dimensional object non-detection ratio of the image is equal to or larger than the preset detecting ratio threshold value k6, whereas when it is less than the detection ratio threshold value k6, the image capability determination timer is decremented. Likewise, when the three-dimensional object non-detection ratio of the laser radar is equal to or larger than the preset detection ratio threshold value k5, the laser radar capability determination timer is incremented, whereas when it is less than the detection ratio threshold value k5, the laser radar capability determination timer is decremented.

Then, the process goes to S514 and determines whether or not the value of the image capability determination timer exceeds the preset output threshold value k1. When the value exceeds the output threshold value k1, the process goes to S515 and lights the detected state display lamp 8b as prescribed by deciding that the distance measuring capability of image is deteriorated. Further, when the value of the image capability determination timer is equal to or less than the preset elimination threshold value k2 (<k1) at S514, the process goes to S515 and extinguishes the detected state display lamp 8b being lit.

Further, the process goes to S514 and determines whether or not the value of the laser radar capability determination timer exceeds the preset output threshold value k3. When the value exceeds the output threshold value k3, the process goes to S515 and lights the detected state display lamp 8b as prescribed by deciding that the distance measuring capability of the laser radar is deteriorated. Further, when the value of the laser radar capability determination timer is equal to or less than the preset elimination threshold value k4 (<k3), the process goes to S515 and extinguishes the detected state display lamp 8b being lit.

As described above, according to this embodiment, the deterioration of the distance measuring capabilities of the image and the laser radar is determined depending on whether or not there is the distance data of the image and the distance data of the laser radar that have detected the finally detected three-dimensional object. Accordingly, it is possible to promptly and accurately determine the deterioration of the distance measuring capabilities of the image and the laser radar. Note that, in this embodiment, the three-dimensional object is diagnosed simply depending upon whether or not there is the image-measured distance data zln1 or the laser-measured distance data zln2. However, the three-dimensional object can be also simply diagnosed by another method, for example, by comparing the difference between the three-dimensional object to be diagnosed and the image-measured distance data zln1 with the difference between the three-dimensional object to be diagnosed and the laser-measured distance data distance data zin2.

After the distance data diagnosis processing described above is executed at S106, the process goes to S107 and executes a collision/contact alarm control. That is, other vehicles, obstacles, and the like existing on the right and left lanes adjacent to the lane of the vehicle 1 are extracted on the basis of the information of the three-dimensional objects from the three-dimensional object detection processing section 5d, the vehicle speeds V from the vehicle speed sensor 6, and the like, the possibility of the collision and the contact of them with the vehicle 1 is decided from the sizes of the detected objects, the relative speeds of them to the vehicle 1 determined from the positional changes with the time, and the alarm is given by lighting the collision alarm lamp 8a of the combination meter 8 according to the result of decision, when necessary.

As described above, according to the present invention, the three-dimensional object existing in front of the vehicle 1 can be promptly and accurately recognized based on the information from the image and the information from the laser radar without executing unnecessary processing.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A monitor system of a vehicle outside comprising:

image-measured distance detection means for detecting a distance data between the vehicle and a three-dimensional object existing in front of the vehicle based on information of an image in front of the vehicle;

laser-measured distance detection means for detecting the distance data between the vehicle and the three-dimensional object existing in front of the vehicle on the basis of the information of a laser radar by projecting a laser beam from the vehicle; and three-dimensional object recognition means for recognizing the three-dimensional object existing in front of the vehicle based on the distance data detected by the image-measured distance detection means and the distance data detected by the laser-measured distance detection means, wherein the three-dimensional object recognition means coordinates the distance data detected by the image-measured distance detection means and the distance data detected by the laser-measured distance detection means, and makes ineffective the distance data detected by the image-measured distance detection means which exist between two distance data existing in the horizontal direction detected by the laser-measured distance detection means and which are at positions farther than the positions of the two distance data by a first preset distance value when the two distance data are within a preset range and the difference between the distance values of the two distance data is within a second preset distance value.

2. The monitor system according to claim 1, wherein:

the three-dimensional object recognition means makes ineffective the distance data detected by the image-measured distance detection means which exist between the two distance data and which are at the positions farther than the positions of the two distance data by the first preset distance when the two distance data are distance data having a distance equal to or more than a third preset value.

3. The monitor system according to claim 1, wherein:

the three-dimensional object recognition means presets a survey area using the coordinated distance data as a reference, recognizes the three-dimensional object by making the ineffective distance data, which exist at the positions farther than the survey area, when the coordinated distance data is distance data having a distance less than a fourth preset distance value.

4. The monitor system according to claim 1, wherein:

the three-dimensional object recognition means makes ineffective the distance data detected by the image-measured distance detection means which exists between the two distance data and which are at the positions farther than the positions of the two distance data by the first preset distance value when the two distance data are distance data having a distance equal to or more than a third preset distance value, and presets a survey area using the coordinated distance data as a reference and makes ineffective distance data which exists at the positions farther than the survey area when the coordinated distance data is distance data having a distance less than a fourth preset distance value.

5. The monitor system according to claim 1, wherein said three-dimensional object recognition means comprises a distance data coordinating section and a three-dimensional object detection processing section.

6. The monitor system according to claim 1, further comprising a warning control means that extracts additional objects existing on the right and left lanes adjacent to a lane that the vehicle is traveling in based on three-dimensional object information from the three-dimensional object recognition means.

7. A method for monitoring an outside of a vehicle comprising the steps of:

image-measured distance detection step of detecting a distance data between the vehicle and a three-dimensional object existing in front of the vehicle based on information of an image in front of the vehicle;

laser-measured distance detection step of detecting the distance data between the vehicle and the three-dimensional object existing in front of the vehicle on the basis of the information of a laser radar by projecting a laser beam from the vehicle; and three-dimensional object recognition step of recognizing the three-dimensional object existing in front of the vehicle based on the distance data detected by the image-measured distance detection step and the distance data detected by the laser-measured distance detection step, wherein the three-dimensional object recognition step coordinates the distance detected by the image-measured distance detection step and the distance data detected by the laser-measured distance detection step, and makes ineffective the distance data existing in the horizontal direction detected by the laser-measured distance detection step and which are at the positions farther than the positions of the two distance data by a first preset distance value when the two distance data are within a preset range and the difference between the distance values of the two distance data is within a second preset distance value.

8. A vehicle drive assist apparatus comprising:

an image recording device mounted to the vehicle for three-dimensionally recording an object outside of the vehicle;

a laser projection unit for projecting and receiving a laser beam for detecting three-dimensional objects located outside of the vehicle;

a vehicle drive apparatus control device comprising:
an image-measured distance detection means for detecting a distance data between the vehicle and a three-dimensional object existing in front of the vehicle based on information received from the image recording device;
a laser-measured distance detection means for detecting the distance data between the vehicle and the three-dimensional object existing in front of the vehicle on the basis of information received from the laser projection unit; and
a three-dimensional object recognition means for recognizing the three-dimensional object existing in front of the vehicle based on the distance data detected by the image-measured distance detection means and the distance data detected by the laser-measured distance detections means, wherein the three-dimensional object recognition means coordinates the distance data detected by the image-measured distance detection means and the distance data detected by the laser-measured distance detection means and makes ineffective the distance data detected by the image-measured distance detection means which exist between two distance data existing in the horizontal direction detected by the laser-measured distance detection means and which are at the positions farther than the positions of the two distance data by a first preset distance value when the two distance data are within a preset range and the difference between the distance values of the two distance data is within a second preset distance value.

9. The vehicle drive assist apparatus according to claim 8, wherein said image recording device comprises a right camera and a left camera.

10. The vehicle drive assist apparatus according to clam 8, further comprising:
   a vehicle speed sensor for detecting a vehicle speed and supplying the vehicle speed to said control device.

11. The vehicle drive assist apparatus according to claim 8, further comprising:
   a steering angle sensor for detecting a steering angle and supplying steering angle to said control device.

12. The vehicle drive assist apparatus according to claim 8, wherein said three-dimensional object recognition means comprises a distance data coordinating section and a three-dimensional object detection processing section.

13. The vehicle drive assist apparatus according to claim 8, further comprising:
   a warning control means that extracts additional objects existing on the right and left lanes adjacent to a lane that the vehicle is traveling in based on three-dimensional object information from the three-dimensional object recognition means.

14. The vehicle drive assist apparatus according to claim 8, further comprising:
   a lighting collision lamp that notifies an operator of the vehicle when said control device determines that there is a risk of the vehicle colliding with an exterior objection.

15. A monitor system of a vehicle outside comprising:
   an image-measured distance detector for detecting a distance data between the vehicle and a three-dimensional object existing in front of the vehicle based on information of an image in front of the vehicle;
   a laser-measured distance detector for detecting the distance data between the vehicle and the three-dimensional object existing in front of the vehicle on the basis of the information of a laser radar by projecting a laser beam from the vehicle; and
   a three-dimensional object recognizer for recognizing the three-dimensional object existing in front of the vehicle based on the distance data detected by the image-measured distance detector and the distance data detected by the laser-measured distance detector,
   wherein the three-dimensional object recognizer coordinates the distance data detected by the image-measured distance detector and the distance data detected by the laser-measured distance detector, and makes ineffective the distance data detected by the image-measured distance detector which exist between two distance data existing in the horizontal direction detected by the laser-measured distance detector and which are at positions farther than the positions of the two distance data by a first preset distance value when the two distance data are within a preset range and the difference between the distance values of the two distance data is within a second preset distance value.

16. A method for monitoring an outside of a vehicle comprising:
   detecting a distance data between the vehicle and a three-dimensional object existing in front of the vehicle based on information of an image in front of the vehicle;
   detecting the distance data between the vehicle and the three-dimensional object existing in front of the vehicle on the basis of the information of a laser radar by projecting a laser beam from the vehicle; and
   recognizing the three-dimensional object existing in front of the vehicle based on the distance data based on the information of the image in front of the vehicle the distance data detected on the basis of the information of the laser radar
   wherein the distance data based on the information of the image in front of the vehicle and the distance data detected on the basis of the information of the laser radar is coordinated, and makes ineffective the distance data based on the information of the image in front of the vehicle which exist between two distance data existing in the horizontal direction detected on the basis of the information of the laser radar and which are at the positions farther than the positions of the two distance data by a first preset distance value when the two distance data are within a preset range and the difference between the distance values of the two distance data is within a second preset distance value.

* * * * *